US009043396B2

(12) United States Patent
Hammer et al.

(10) Patent No.: US 9,043,396 B2
(45) Date of Patent: May 26, 2015

(54) ANNOTATING ELECTRONIC PRESENTATION

(75) Inventors: Mette Friedel Margareta Hammer, Helsinki (FI); Ruthie D. Lyle, Durham, NC (US); Patrick Joseph O'Sullivan, Ballsbridge (IE); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 13/535,728

(22) Filed: Jun. 28, 2012

(65) Prior Publication Data

US 2014/0006491 A1   Jan. 2, 2014

(51) Int. Cl.
*G06F 15/16* (2006.01)
*G06Q 10/10* (2012.01)

(52) U.S. Cl.
CPC ....... *G06Q 10/101* (2013.01); *H04M 2203/655* (2013.01)

(58) Field of Classification Search
CPC ..... G06F 15/16; G06F 17/289; G06F 17/241; G06F 17/30997; G06F 17/30011; H04L 12/1827; H04L 12/1818; G06Q 10/10; G06Q 3/0045; G06Q 2213/13248; G06Q 2213/1324; H04M 3/567; H04M 2203/2061; H04M 2201/38
USPC .................................. 709/204; 715/233, 230
See application file for complete search history.

(56) References Cited

U.S. PATENT DOCUMENTS

| 6,532,218 | B1 | 3/2003 | Shaffer et al. |
| 7,733,366 | B2 | 6/2010 | Beavers et al. |
| 8,581,931 | B2 * | 11/2013 | Arora et al. ................... 345/629 |
| 2002/0087595 | A1 | 7/2002 | Friedman et al. |
| 2004/0153504 | A1 | 8/2004 | Hutchinson et al. |
| 2004/0243969 | A1 | 12/2004 | Kamery et al. |
| 2007/0260683 | A1 | 11/2007 | Hintermeister et al. |
| 2007/0282948 | A1 | 12/2007 | Praino et al. |
| 2007/0298404 | A1 | 12/2007 | Amell et al. |
| 2008/0008458 | A1 | 1/2008 | Gudipaty et al. |
| 2009/0197236 | A1 | 8/2009 | Phillips, II |
| 2009/0325142 | A1 | 12/2009 | Beavers et al. |
| 2010/0218099 | A1 | 8/2010 | van Melle et al. |
| 2010/0332959 | A1 | 12/2010 | Mitchell et al. |
| 2011/0154180 | A1 * | 6/2011 | Evanitsky et al. ............ 715/233 |
| 2012/0117153 | A1 * | 5/2012 | Gunasekar et al. ........... 709/204 |

* cited by examiner

*Primary Examiner* — Kyung H Shin
(74) *Attorney, Agent, or Firm* — Holland & Knight LLP; Brian J. Colandreo, Esq.; Jeffrey T. Placker, Esq.

(57) ABSTRACT

Systems and methods for annotating electronic meetings are generally provided. Embodiments herein may include receiving an indication of one or more trusted users for an electronic meeting. The one or more trusted users may include a subset of a plurality of attendees of the electronic meeting. Annotation privileges may be associated with the one or more trusted users for the electronic meeting. An annotation associated with the electronic meeting may be received from at least one of the one or more trusted users. An output representative of the annotation may be generated.

18 Claims, 6 Drawing Sheets

ANNOTATING ELECTRONIC PRESENTATION

BACKGROUND

The present disclosure generally relates to electronic meeting systems, and more particularly to annotating electronic presentations.

Web conferencing systems allow conferencing events to be shared across several, possibly remote locations. The conferencing events may allow information to be shared generally in real-time or near real-time. Examples of web conferences may include web-based seminars, presentations, lectures, workshops or the like. In some instances, a presenter may speak over a standard telephone line, while referencing information that may be presented onscreen. In some instances, web conferencing systems may incorporate the use of voice-over-IP technologies, that may allow for a completely web (or network) based communication.

BRIEF SUMMARY

In one implementation, a method, in accordance with this disclosure, may include receiving, on a processor, an indication of one or more trusted users for an electronic meeting. The one or more trusted users may include a subset of a plurality of attendees of the electronic meeting. The method may also include associating, on the processor, annotation privileges with the one or more trusted users for the electronic meeting. The method may also include receiving, on the processor, an annotation associated with the electronic meeting from at least one of the one or more trusted users. The method may further include generating, on the processor, an output representative of the annotation.

One or more of the following features may be included. An annotation privilege notice for the one or more trusted users may be generated. The annotation may be associated with an electronic meeting slide. The annotation may be associated with an element of the electronic meeting slide.

The output representative of the annotation may be generated in substantially real-time with receiving the annotation. The output representative of the annotation may be generated in response to an indication of a conclusion of the electronic meeting. The method may also include defining annotation review privileges associated with one or more users.

According to another implementation, a computer program product includes a non-transitory computer readable medium having a plurality of instructions stored on it. When executed by a processor, the instructions may cause the processor to perform operations including receiving an indication of one or more trusted users for an electronic meeting. The one or more trusted users may include a subset of a plurality of attendees of the electronic meeting. Instructions may be included for associating annotation privileges with the one or more trusted users for the electronic meeting. Instructions may also be included for receiving an annotation associated with the electronic meeting from at least one of the one or more trusted users. Instructions may further be included for generating an output representative of the annotation.

One or more of the following features may be included. Instructions may be included for generating an annotation privilege notice for the one or more trusted users. The annotation may be associated with an electronic meeting slide. The annotation may be associated with an element of the electronic meeting slide.

The output representative of the annotation may be generated in substantially real-time with receiving the annotation. The output representative of the annotation May be generated in response to an indication of a conclusion of the electronic meeting. Instructions may further be included for defining annotation review privileges associated with one or more users.

According to another implementation, a computing system includes one or more processors. The one or more processors may be configured to receive an indication of one or more trusted users for an electronic meeting. The one or more trusted users may include a subset of a plurality of attendees of the electronic meeting. The one or more processors may also be configured to associate annotation privileges with the one or more trusted users for the electronic meeting. The one or more processors may also be configured to receive an annotation associated with the electronic meeting from at least one of the one or more trusted users. The one or more processors may further be configured to generate an output representative of the annotation.

One or more of the following features may be included. The one or more processors may be further configured for generating an annotation privilege notice for the one or more trusted users. The annotation may be associated with an electronic meeting slide. The annotation may be associated with an element of the electronic meeting slide.

The output representative of the annotation may be generated in substantially real-time with receiving the annotation. The output representative of the annotation may be generated in response to an indication of a conclusion of the electronic meeting. The one or more processors may be further configured for defining annotation review privileges associated with one or more users. The details of one or more implementations are set forth in the accompanying drawings and the description below. Other features and advantages will become apparent from the description, the drawings, and the claims.

DETAILED DESCRIPTION

Figure 1:
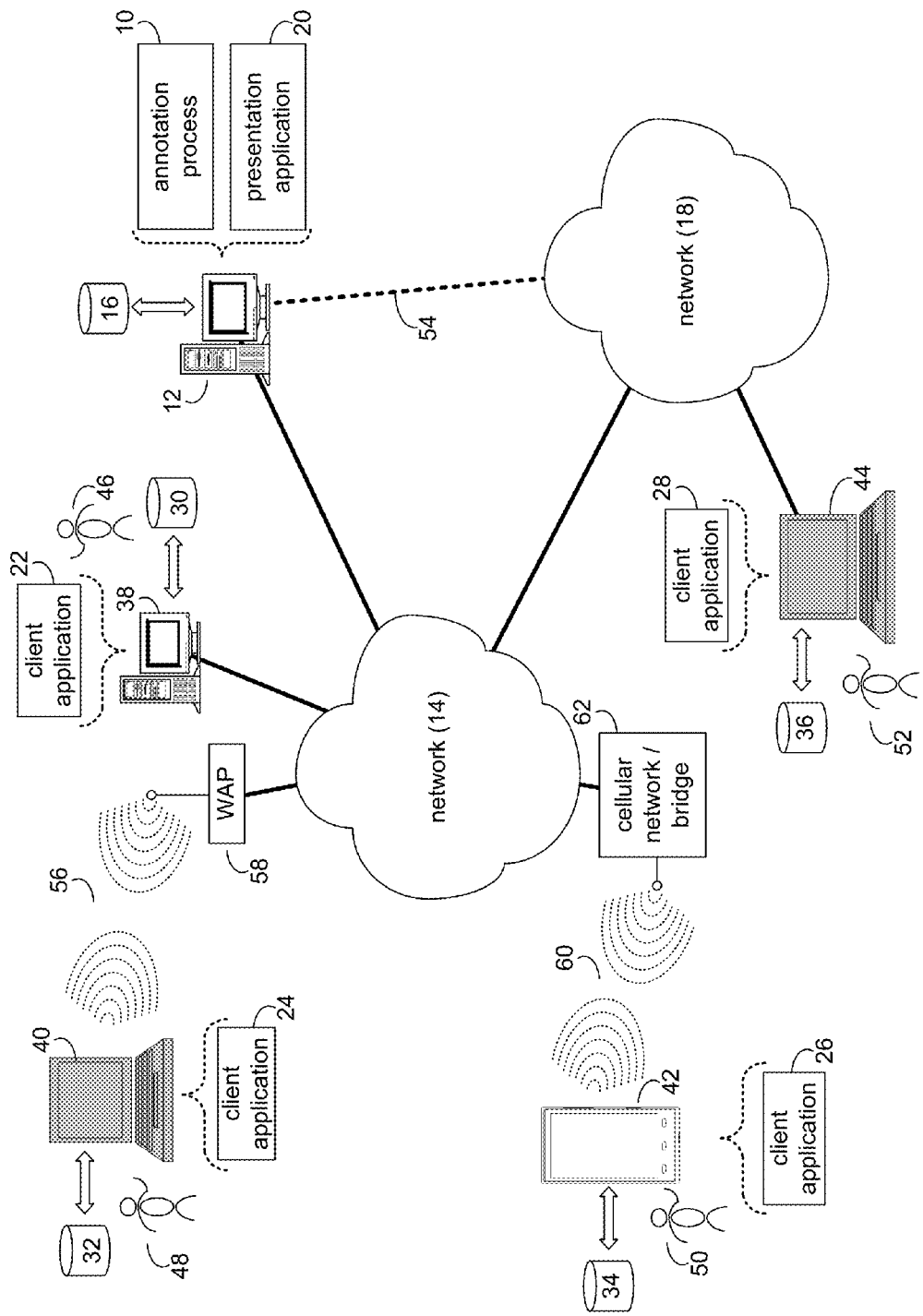
FIG. 1 diagrammatically depicts an annotation process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium (also herein referred to as a computer readable medium and/or a storage device associated with a computing device or client electronic device) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable or computer-readable medium may be any non-transitory medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages, and/or in scripting languages such as JavaScript programming language or the Groovy programming language. Furthermore, various application programming interfaces (APIs) and/or application development frameworks such as the Dojo or Grails development frameworks may be used in writing the computer program. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown annotation process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

As will be described in greater detail below, according to an example embodiment annotation process 10 may receive an indication of one or more trusted users for an electronic meeting. The one or more trusted users may include a subset of a plurality of attendees of the electronic meeting. Annotation process 10 may also associate annotation privileges with the one or more trusted users for the electronic meeting. Annotation process 10 may also receive an annotation associated with the electronic meeting from at least one of the one or more trusted users. Annotation process 10 may further generate an output representative of the annotation.

The instruction sets and subroutines of annotation process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® HTTP Server, Apache® Tomcat® application server, that allows for access to server computer (e.g., via network 14) using one or more protocols, examples of which may include but are not limited to HTTP (i.e., HyperText Transfer Protocol), SIP (i.e., session initiation protocol), and the Lotus® Sametime® VP protocol, or other suitable protocol. (Webserver is a trademark of Novell Corporation in the United States, other countries, or both; and Apache and Tomcat are registered trademarks of Apache Software Foundation in the United States, other countries, or both; Lotus and Sametime are registered trademarks of International Business Machine Corporation in the United States other countries, or both). Network 14 may be connected to one or more secondary networks (e.g., network 18), examples of which may include but are not limited to: a local area network; a wide area network; or an intranet, for example.

Server computer 12 may execute a presentation application (e.g., presentation application 20), examples of which may include, but are not limited to, IBM Sametime®, WebEx, or the like (IBM and Sametime are trademarks of International Business Machine Corporation in the United States, other countries, or both; WebEx is a registered trademark of Cisco Systems Inc. in the United States, other countries, or both.) The instruction sets and subroutines of presentation application 20 may be stored on storage device 16 coupled to server computer 12, and may be executed by one or more processors (not shown) and one or more memory architectures (not shown) incorporated into server computer 12. Presentation application 20 may allow for performance, publication, participation, and/or execution of computer-based presentations, meetings, workshops, or other collaborative activities, herein generally referred to as electronic meetings or eMeetings. eMeetings may include visual and/or visual and audio component that may be provided, at least in part, by presentation application 20. Presentation application 20 may facilitate participation an eMeeting by one or more client applications (e.g., client applications 22, 24, 26, 28). Accordingly, in an example embodiment, presentation application 20 may facilitate participation in an eMeeting by one or more participants and one or more moderators (e.g., who may present information during the course of the eMeeting). Examples of client applications 22, 24, 26, 28 may include, but are not limited to, a web browser, and/or another general purpose application and/or special purpose application that may allow for participation in an eMeeting.

Annotation process 10 may interface and/or interact with presentation application 20, and/or may be a module or component of presentation application 20. In addition/as an alternative to being a server-side process, the annotation process may be a client-side process (not shown) that may reside on a client electronic device (described below) and may interact with, and/or may be a module or component of, a client application (e.g., one or more of client applications 22, 24, 26, 28). Further, the annotation process may be a hybrid server-side/client-side process that may interact with server-side presentation application and a client application (e.g., one or more of client applications 22, 24, 26, 28). As such, the annotation process may reside, in whole, or in part, on server computer 12 and/or one or more client electronic devices.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, tablet computer or the like), notebook computer 44, for example. Each of client electronic devices 38, 40, 42, 44 may execute an appropriate operating system, for example, Mac OS, iOS, Android OS, Windows, or other suitable operating system. (Mac OS is a trademark of Apple Inc. in the United States, other countries, or both; iOS is a trademark of Cisco Systems, Inc.; Android is a trademark of Google Inc. in the United States, other countries, or both; Windows is a trademark of Microsoft Corporation in the United Sates, other countries, or both.)

Using client applications 22, 24, 26, 28, users 46, 48, 50, 52 may access annotation process 10 and/or presentation application 20 and may e.g., participate in an eMeeting. Users 46, 48, 50, 52 may access annotation process 10 directly through the device on which the client application (e.g., client applications 22, 24, 26, 28) is executed, namely client electronic devices 38, 40, 42, 44, for example. Users 46, 48, 50, 52 may access comprehension process 10 directly through network 14 or through secondary network 18. Further, server computer 12 (i.e., the computer that executes comprehension process 10) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Mobile computing device 42 is shown wirelessly coupled to network 14 via wireless communication channel 60 established between mobile computing device 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Figure 2:
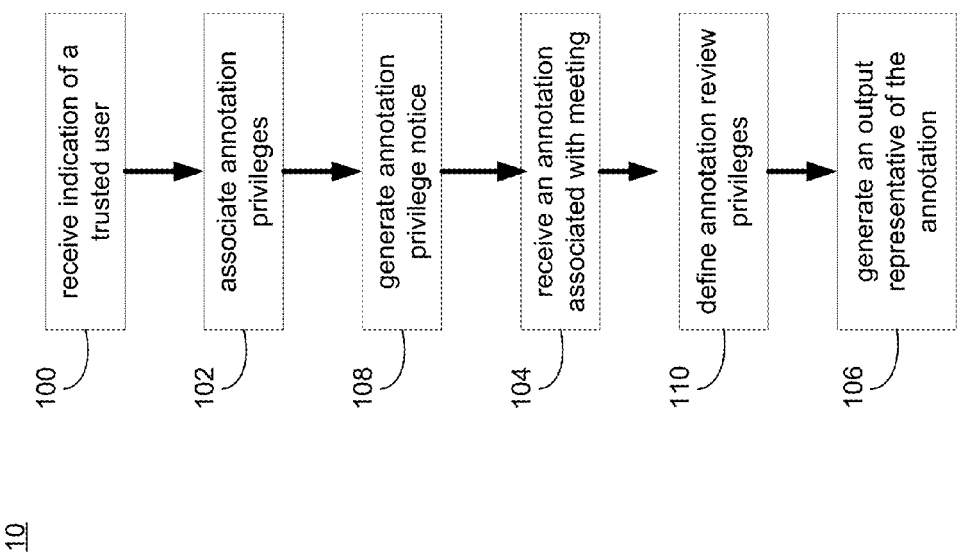
FIG. 2 is a flowchart of a process that may be executed by the annotation process of FIG. 1.

Referring also to FIG. 2, according to one aspect, annotation process 10 may receive 100 an indication of one or more trusted users for an electronic meeting. The one or more trusted users may include a subset of a plurality of attendees of the electronic meeting. Annotation process 10 may also associate 102 annotation privileges with the one or more trusted users for the electronic meeting. Annotation process 10 may also receive 104 an annotation associated with the electronic meeting from at least one of the one or more trusted users. Annotation process 10 may further generate 106 an output representative of the annotation.

Generally, an electronic meeting (which may also be referred to as an eMeeting) may include a collaborative event in which information may be shared among a plurality of participants of the eMeeting over a computing network. As a component of an eMeeting visual materials (e.g., presentation slides, pictures, video content, and the like) may be presented to the participants via a computing device associated with one or more of the participants. For example, each participant may receive and view the visual material via a respective computing device having a display associated with each participant (and or associated with a group of participants.

Figure 3:
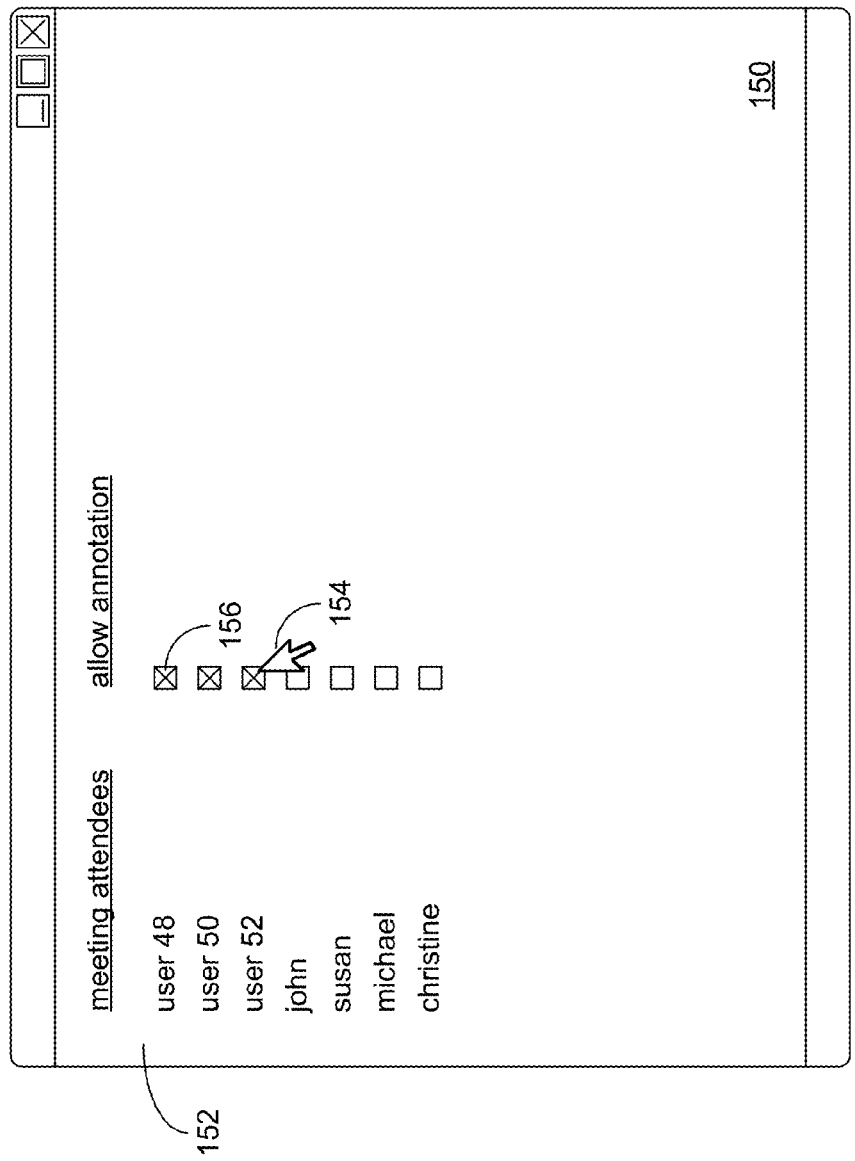
FIG. 3 graphically depicts a user interface that may be generated, at least in part, by the annotation process of FIG. 1.

In an embodiment herein a presenter (and/or a moderator, administrator, or other user) may wish to allow a portion of the attendees of the eMeeting (i.e., participants of the eMeeting) to provide comments, cues, feedback, or the like with respect to the eMeeting. Referring also to FIG. 3, annotation process 10 (alone and/or in conjunction with one or more of presentation application 20 and client application 22) may provide user interface 150. User interface 150 may include a listing of meeting attendees (e.g., listing 152, generally) for an electronic meeting. Consistent with the illustrated embodiment, user 46 may select, e.g., via onscreen pointer 154 (which may be controlled by a pointing device, such as a mouse; not shown) one or more users (e.g., user 48, user 50, user 52) as being allowed to provide annotations relative to the eMeeting (e.g., by selecting an associated check box 156). In response to user 46 selecting one or more users as being allowed to provide annotations relative to the eMeeting, annotation process 10 may receive 100 an indication of one or more trusted users for an electronic meeting. The one or more trusted users selected as being allowed to provide annotations relative to the eMeeting may include a subset of all of the plurality of attendees of the eMeeting. In some embodiments, the remaining attendees of the eMeeting may not be allowed to make annotations relative to the eMeeting. Further, in some embodiment, the presenter or moderator may select the one or more trusted users that may be allowed to provide annotations relative to the eMeeting prior to the eMeeting beginning. In other embodiments, the presenter or moderator may be capable of selecting one or more trusted users while the eMeeting is ongoing (e.g., after the eMeeting has begun).

In an embodiment, in response to receiving 100 the indication of the one or more trusted users for the electronic meeting, annotation process 10 may associate 102 annotation privileges with the one or more trusted users for the electronic meeting. In an embodiment, the annotation privileges may be associated 102 with one or more particular users with respect to a particular electronic meeting. As such, a given trusted user may only have annotation privileges for the specific electronic meeting. In an embodiment, annotation process 10 may generate 108 an annotation privilege notice for the one or more trusted users. The annotation privilege notice may notify the one or more trusted users that they have annotation privileges with respect to a particular eMeeting. According to various embodiments, different annotation privilege notifications may be utilized and/or different annotation privilege notifications may be utilized for differ trusted users. Examples of annotation privilege notifications that may be generated 108 by annotation process 10 may include, but are not limited to, an indicator associated with the electronic meeting (e.g., in an invitation to the electronic meeting in a calendaring/scheduling application associated with the one or more trusted users); an electronic message transmitted to the one or more trusted users (e.g., an email, instant message, or the like), and/or a notification provided via a client application during the electronic meeting. Various additional/alternative annotation privilege notifications may equally be utilized.

Consistent with the foregoing, in some embodiments the association 102 of annotation privileges and the generation 108 of annotation privilege notifications may orchestrate, communicate, and manage the rights of the trusted user (and/or the electronic meeting attendees in general) for providing annotation with respect to an eMeeting. Accordingly, in some embodiments, it may be possible to receive annotations (e.g., comments, remarks, or other cues) from the trusted user, while not receiving annotations from all of the electronic meeting attendees, which may be distracting for the presenter of the electronic meeting.

Further, annotation process 10 may receive 104 an annotation associated with the electronic meeting from at least one of the one or more trusted users. In general, an annotation may include a comment, remark, edit, questions, cue, or other information or feedback relative to an electronic meeting. According to an example embodiment, an annotation may be generally associated with the eMeeting. In other embodiments, the annotation may be associated with an electronic meeting slide (e.g., a particular slide of an eMeeting presentation). For example, an eMeeting may include a plurality of presentation slides (e.g., PowerPoint® slide presentation). (PowerPoint is a registered trademark of Microsoft Corporation in the United States, other countries, or both.) For example, and referring also to FIG. 4, a presentation slide 200 of an eMeeting may be displayed for a trusted user (e.g., user 48 for the purpose of explanation) via client application 24 (alone and/or in conjunction with one or more of presentation application and annotation process 10). In an embodiment, user 48 may generate an annotation relative to presentation slide 200 by invoking an annotation dialog box relative to slide 200. For example, user 48 may right-click (or any other suitable operation) a window including slide 200 using onscreen pointer 154. Right-clicking within slide 200 may result in annotation process 10 (alone and/or in conjunction with one or more of client application 24 and presentation application 20) providing annotation pop-up 202. In an embodiment, user 48 may input (e.g., using a keyboard or other input device associated with client electronic device 40) a desired comment. Further, user 48 may select submit button 204 within annotation pop-up 202. In response to user 48 selecting submit button 204, annotation process 10 may receive 104 the annotation associated with slide 200. Annotation process 10 may receive 104 the annotation associated with slide 200 directly and/or as a result of the annotation being transmitted to annotation process (e.g., transmitted from client electronic device 40 to server computer 12). In the event that user 48 may reconsider sending the annotation, user 48 may select cancel button 206 from within annotation pop-up 202.

Figure 4:
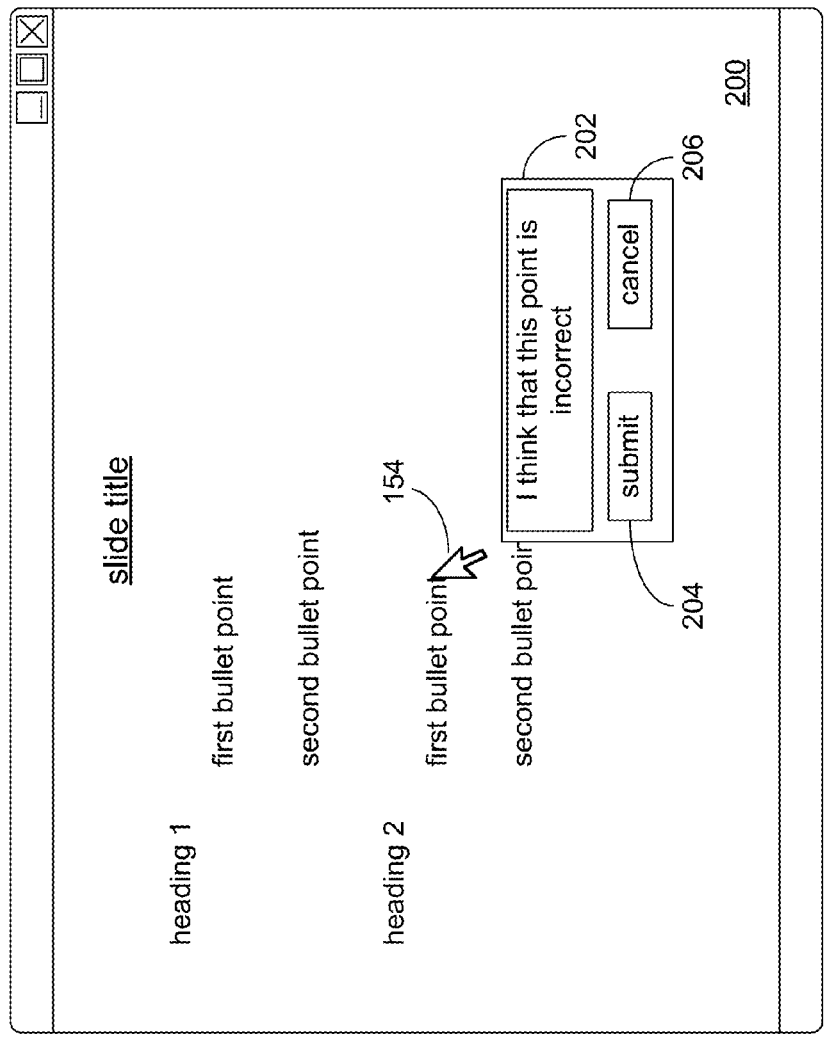
FIG. 4 graphically depicts a user interface that may be generated, at least in part, by the annotation process of FIG. 1.

Further in some embodiment, the annotation may be associated with an element of the electronic meeting slide. For example, as shown in FIG. 4, user 48 may select (e.g., by right-clicking using onscreen pointer 154) a particular element within slide 200 (e.g., "first bullet point" of "heading 2" in the illustrated example). In such an embodiment, the annotation input via annotation pop-up 202 may not only be associated with slide 200, but may further be associated with the particular element (e.g., "first bullet point" of "heading 2") within slide 200. In an example embodiment, slide 200 may include metadata that may allow the annotation to be associated with specific elements of slide 200 (e.g., in addition and/or as an alternative to associating screen position within slide 200). For example, the metadata included with slide 200 may identify elements (e.g., features and/or objects of interest) within slide 200. Examples of elements within slide 200 may include, but are not limited to, titles, headings, subheadings, text blocks (and/or individual words within text blocks), graphics, or other elements within slide 200. Accordingly, utilizing the metadata included within slide 200, annotations may be associated with particular elements of slide 200. Various additional and/or alternative mechanisms may be utilized for associating an annotation with a particular element of a presentation slide.

Figure 5:
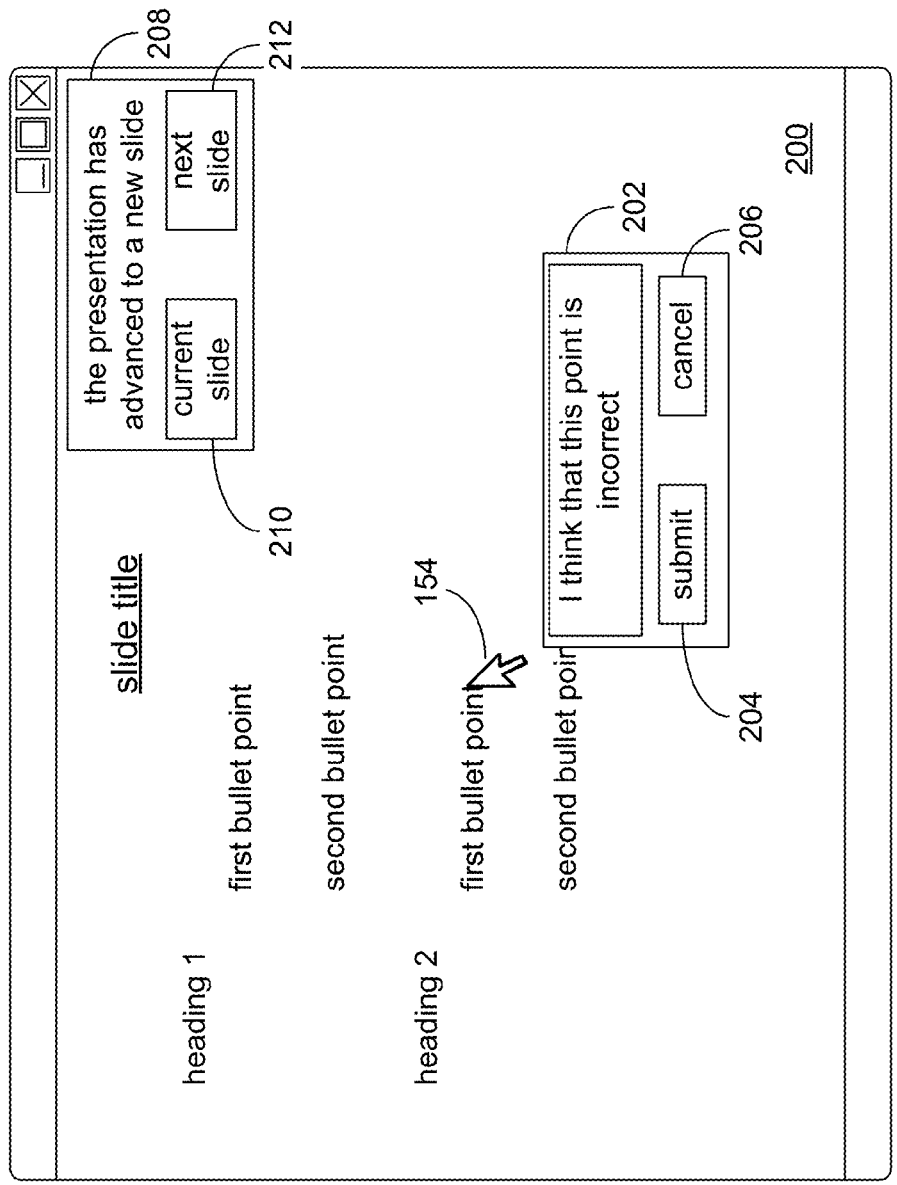
FIG. 5 graphically depicts a user interface that may be generated, at least in part, by the annotation process of FIG. 1.

During the course of an eMeeting including a slide presentation, the slides of the presentation may be advanced based on, for example, an input by the presenter of the eMeeting, a defined time delay for the presentation, or some other mechanism for advancing slides of a presentation. According to an embodiment, annotation process 10 (alone and/or in conjunction with one or more of presentation process 20 and one or more client application) may allow a slide to persist relative to a trusted user once the trusted user begins annotating the slide. For example, if a trusted user begins making an annotation to a slide (for example by right-clicking on the slide, as described above) and the presentation of the eMeeting subsequently advances to a new slide before the trusted user completes the annotation (e.g., by either selecting submit button 204 or cancel button 206), the slide being annotated may persist (i.e., not advance to the next slide in the presentation) for the trusted user annotating the slide. Accordingly, notwithstanding the presentation advancing to a new slide, the trusted user may finish making his annotation. In an embodiment, and referring also to FIG. 5, in a situation in which the presentation may advance to a new slide while a trusted user (e.g., user 48) is annotating slide 200, one or more of annotation process 10, presentation application 20, and client application 24 may provide indication pop-up 208, that the presentation has advanced to a new slide. In an example embodiment, in addition to providing an indication that the presentation has advanced to a new slide, indication pop-up 208 may also include options (e.g., for once user 48 completes the annotation) to advance to the current slide of the presentation (e.g., by selecting current slide button 210) and/or to advance to a next slide of the presentation (e.g., by selecting next slide button 212). For example, in the event that the presentation may advance through more than one slide while user 48 is generating the annotation of slide 200, user 48 may select next slide button 212 in order to progress through any intervening slides between slide 200 and the current slide of the presentation (e.g., such that user 48 may not miss any of the intervening slides and/or may have an opportunity to annotation such intervening slides).

Annotation process 10 may further generate 106 an output representative of the annotation. For example, the output representative of the annotation may allow the presenter or the eMeeting (and/or additional individuals) to view the annotation. In some embodiments, the output representative of the annotation may include a visual representation of the annotation. In other embodiments, other embodiments, the output representative of the annotation may take different forms, including an electronic record of the annotation. In an embodiment, the output representative of the annotation may be generated 106 in substantially real-time with receiving 104 the annotation. For example, in such an embodiment, annotation process 10 may generate 106 the output representative of the annotation as the trusted user is creating the annotation and/or as soon as the trusted user completes that annotation. In such an embodiment, the presenter and/or another user may view the annotation substantially at the same time that the annotation is submitted by the user creating the annotation.

Figure 6:
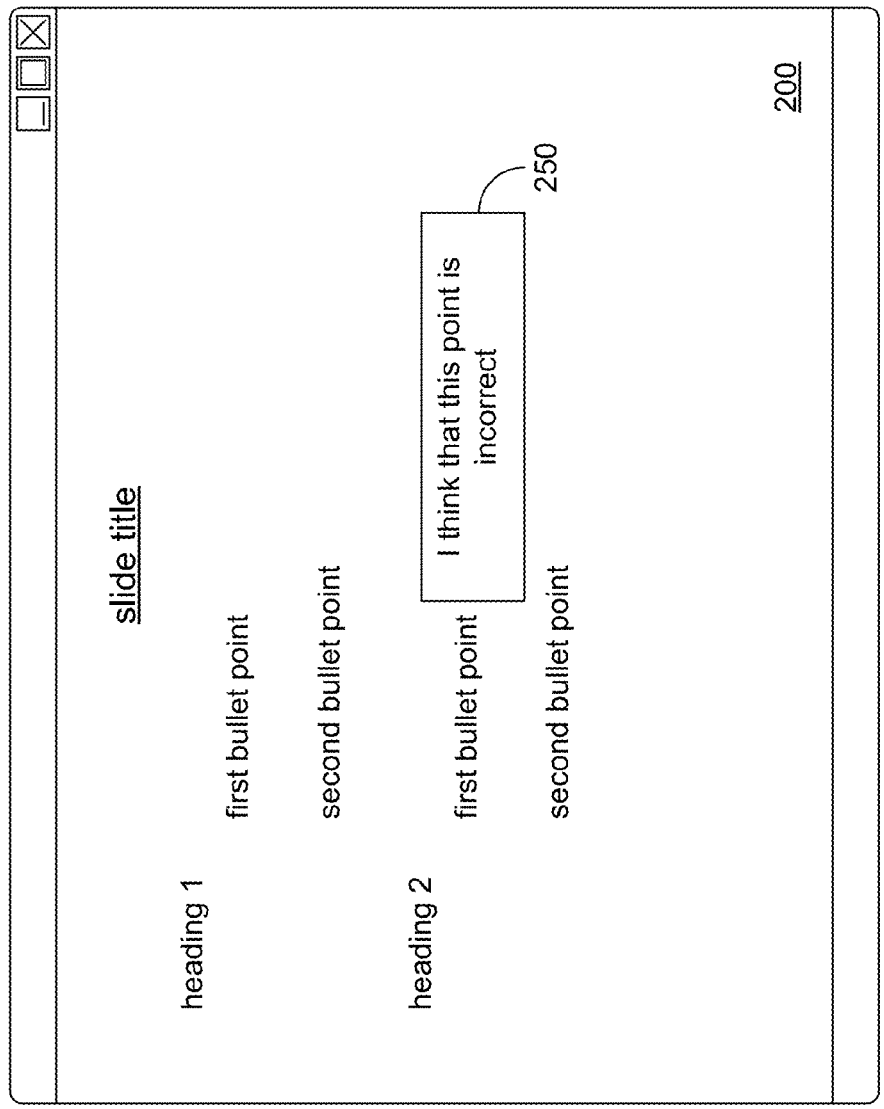
FIG. 6 graphically depicts a user interface that may be generated, at least in part, by the annotation process of FIG. 1.

For example, and referring to FIG. 6, continuing with the above example in which user 46 may be a presenter of the eMeeting, slide 200 may be displayed on a client electronic device associated with user 46 (e.g., client electronic device 38) while user 46 is giving the presentation. Upon user 48 generating his annotation and selecting submit button 204, annotation process 10 may receive 104 the annotation (e.g., "I think that this point is incorrect") associated with slide 200 (e.g., associated with "first bullet point" of "heading 2"). In response to receiving 104 the annotation, annotation process 10 (alone and/or in conjunction with one or more of presentation process 20 and client application 22) may generate 106 annotation pop-up 250 including the annotation submitted by user 48. In an embodiment in which the annotation generated by user 48 was associated with an element of the slide, the representation of the annotation generated 106 by annotation process 10 (e.g., annotation pop-up 250) may similarly be associated with the same element of the same slide. In such an embodiment, the presenter may be able to utilize the information of the annotation if desired (e.g., to correct a pieces of information, elaborate on an topic, etc.).

In another embodiment, the output representative of the annotation may be generated in response to an indication of a conclusion of the electronic meeting. For example, a presenter of an eMeeting (and/or another individual, such as an administrator or the like) may determine that receiving annotations during a presentation may be distracting and/or undesirable for the presenter. In such an embodiment, the annotations may be passively received and/or recorded for later review and/or playback. According to such an embodiment, the presenter may not be distracted by the arrival and display of annotation during the presentation. In some embodiments in which an output representative of the annotation may be generated 106 in substantially real time with receiving 104 the annotation, an output representative of the annotation may also be generated in response to a conclusion of the electronic meeting. That is, the annotations may be saved with the presentation, e.g., for later review and/or user by the presenter and/or by another individual.

In an embodiment, annotation process 10 may also define 110 annotation review privileges associated with one or more users. For example, in addition/as an alternative to the annotations only being available to the presenter of the eMeeting, in some embodiments, the annotations may be viewed and/or accessed by one or more additional users. In an example embodiment, annotation process 10 may define 110 annotation review privileges associated with one or more user, in which the annotation review privileges may provide access control relative to the annotations. As such, differential rights may exist between users in which different users may be able to view, or not view, different annotations. For example, in one embodiment, all annotations may be viewed by all users. In another embodiment, annotations may only be viewed by trusted users, and/or by individuals having a determined position within an organizational hierarchy. A user (such as the presenter, and administrator, or another individual) may input one or more annotation review privilege rules. Annotation process 10 may define 110 the annotation review privileges associated with the one or more users based on the annotation review privilege rules. For example, a user may specifically select users that may review annotations. In another example, one or more rules for determining annotation review privileges may be established. For example, users may be allowed to view annotations that they created, but not annotations that another user created. Various additional/alternative annotation review privileges may be associated with one or more users based on various different rules and/or mechanisms for determining access control.

While various embodiments and features have been described herein, it will be apparent to one having skill in the art that the various embodiments and features may be susceptible to combination with one another and/or to various additional/alternative combinations. All such combination of subject matter disclosed herein is intended to be contemplated by the present disclosure.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer-implemented method comprising:
   receiving, on a processor, an indication of one or more trusted users for an electronic meeting, the one or more trusted users including a subset of a plurality of attendees of the electronic meeting;
   associating, on the processor, annotation privileges with the one or more trusted users for the electronic meeting;
   receiving, on the processor, an annotation associated with the electronic meeting from at least one of the one or more trusted users, wherein receiving the annotation associated with the electronic meeting from at least one of the one or more trusted users includes if the one or more trusted users is currently annotating a meeting slide, automatically persisting the meeting slide for the at least one of the one or more trusted users until the one or more trusted users completes the annotation while the electronic meeting advances to a new slide for other attendees of the electronic meeting;
   generating, on the processor, an output representative of the annotation; and
   defining annotation review privileges associated with one or more user having a determined position within an organizational hierarchy.

2. The computer-implemented method of claim 1, further including generating an annotation privilege notice for the one or more trusted users.

3. The computer-implemented method of claim 1, wherein the annotation is associated with an electronic meeting slide.

4. The computer-implemented method of claim 3, wherein the annotation is associated with an element of the electronic meeting slide.

5. The computer-implemented method of claim 1, wherein the output representative of the annotation is generated in substantially real-time with receiving the annotation.

6. The computer-implemented method of claim 1, wherein the output representative of the annotation is generated in response to an indication of a conclusion of the electronic meeting.

7. A computer program product comprising a non-transitory computer readable medium having a plurality of instructions stored thereon, which, when executed by a processor, cause the processor to perform operations comprising:
   receiving an indication of one or more trusted users for an electronic meeting, the one or more trusted users including a subset of a plurality of attendees of the electronic meeting;
   associating annotation privileges with the one or more trusted users for the electronic meeting;
   receiving an annotation associated with the electronic meeting from at least one of the one or more trusted users, wherein receiving the annotation associated with the electronic meeting from at least one of the one or more trusted users includes if the one or more trusted users is currently annotating a meeting slide, automatically persisting the meeting slide for the at least one of the one or more trusted users until the one or more trusted users completes the annotation while the electronic meeting advances to a new slide for other attendees of the electronic meeting;
   generating an output representative of the annotation; and
   defining annotation review privileges associated with one or more user having a determined position within an organizational hierarchy.

8. The computer program product of claim 7, further including instructions for generating an annotation privilege notice for the one or more trusted users.

9. The computer program product of claim 7, wherein the annotation is associated with an electronic meeting slide.

10. The computer program product of claim 9, wherein the annotation is associated with an element of the electronic meeting slide.

11. The computer program product of claim 7, wherein the output representative of the annotation is generated in substantially real-time with receiving the annotation.

12. The computer program product of claim 7, wherein the output representative of the annotation is generated in response to an indication of a conclusion of the electronic meeting.

13. A computing system comprising:
   one or more processors and memory, wherein the memory includes instructions when executed by the one or more processors cause the one or more processors to:
   receive an indication of one or more trusted users for an electronic meeting, the one or more trusted users including a subset of a plurality of attendees of the electronic meeting;
   associate annotation privileges with the one or more trusted users for the electronic meeting;
   receive an annotation associated with the electronic meeting from at least one of the one or more trusted users, wherein receiving the annotation associated with the electronic meeting from at least one of the one or more trusted users includes if the one or more trusted users is currently annotating a meeting slide, automatically persisting the meeting slide for the at least one of the one or more trusted users until the one or more trusted users completes the annotation while the electronic meeting advances to a new slide for other attendees of the electronic meeting;

generate an output representative of the annotation; and defining annotation review privileges associated with one or more user having a determined position within an organizational hierarchy.

14. The system of claim 13, wherein the one or more processors are further configured for generating an annotation privilege notice for the one or more trusted users.

15. The system of claim 13, wherein the annotation is associated with an electronic meeting slide.

16. The system of claim 15, wherein the annotation is associated with an element of the electronic meeting slide.

17. The system of claim 13, wherein the output representative of the annotation is generated in substantially real-time with receiving the annotation.

18. The system of claim 13, wherein the output representative of the annotation is generated in response to an indication of a conclusion of the electronic meeting.

* * * * *